United States Patent [19]

Schröer et al.

[11] Patent Number: 4,521,465
[45] Date of Patent: Jun. 4, 1985

[54] COATED COMPOSITE MATERIAL FOR LINING PASSAGES

[75] Inventors: Walter Schröer, Leverkusen, Fed. Rep. of Germany; Gyula Wlasitsch, Gyoer, Hungary

[73] Assignees: Bayer Aktiengesellschaft, Leverkusen, Fed. Rep. of Germany; Graboplast, Gyoer, Hungary

[21] Appl. No.: 514,918

[22] Filed: Jul. 18, 1983

[30] Foreign Application Priority Data

Jul. 24, 1982 [DE] Fed. Rep. of Germany ....... 3227679

[51] Int. Cl.³ .............................................. B32B 31/00
[52] U.S. Cl. ...................................... 428/35; 428/283; 428/286; 428/423.3; 428/290; 427/333; 427/389.9; 427/412
[58] Field of Search ..................... 428/423.3, 283, 286, 428/290, 288, 35, 36; 427/333, 389.9, 412

[56] References Cited

U.S. PATENT DOCUMENTS

| | | | |
|---|---|---|---|
| 3,310,447 | 3/1967 | Matthews | 428/423.3 X |
| 3,650,880 | 3/1972 | Tieniber | 428/423.3 X |
| 3,759,742 | 9/1973 | Salamon et al. | 428/286 X |
| 3,974,320 | 8/1976 | Gerlach et al. | 428/283 |
| 4,009,063 | 2/1977 | Wood | 156/71 |
| 4,018,954 | 4/1977 | Fukushima et al. | 428/423.3 X |
| 4,064,211 | 12/1977 | Wood | 264/95 |
| 4,071,390 | 1/1978 | Strassel | 428/423.3 X |
| 4,116,741 | 9/1978 | Thoma et al. | 428/423.3 X |
| 4,190,694 | 2/1980 | Mück et al. | 428/286 X |
| 4,310,373 | 1/1982 | Schuhmacher et al. | 428/423.3 X |

FOREIGN PATENT DOCUMENTS 1039836 8/1966 United Kingdom .
1423819 2/1976 United Kingdom .

*Primary Examiner*—George F. Lesmes
*Assistant Examiner*—Nancy A. B. Swisher
*Attorney, Agent, or Firm*—Gene Harsh; Lawrence S. Pope; Aron Preis

[57] ABSTRACT

A bonded composite laminate is provided comprising a textile layer and a plastic film which contains polyurethane urea coating which laminate is suitable for lining and repair of pipelines and canalizations.

18 Claims, No Drawings

COATED COMPOSITE MATERIAL FOR LINING PASSAGES

FIELD OF THE INVENTION

The invention is related to a composite laminate and more particularly to a bonded laminate of a textile layer and polyurethane coatings.

SUMMARY OF THE INVENTION

This invention relates to coated composite materials with high stability, high flexibility and simplified processibility, preferably in a tubular shape, for lining passages, in particular for the repair of sewer pipe systems, comprising a bonded laminate of a reactive resin-impregnable, textile layer and a flexible, extensible, gas, water and monomer-impermeable, pore-free layer of different polyurethane urea reactive coating layers which are joined together undetachably in at least two layers and are applied to the textile layer. The side facing the textile layer of the at least two-layered PU coating comprises a practically styrene-resistant, branched, moderately cross-linked, filler-containing, non-thermoplastic polyurethane reactive coating and the side remote from the textile layer comprises a substantially linear, thermoplastic, reactive coating which may be welded by high frequency, by heat or by polar solvents, and these reactive coating layers are formed in the direct and/or preferably in the transfer coating process from high-solid systems, consisting of blocked NCO prepolymers and aliphatic and/or cycloaliphatic polyamines.

The invention also relates to a process for the production and use of these, preferably tubular, composite materials in a reactive resin-impregnated form for lining passages according to a known lining process.

BACKGROUND OF THE INVENTION

Tubular composite materials are used for lining pipes and passages which, for the most part, have a circular cross-section, in particular for the repair of damaged pipelines or canalizations. According to the prior art, composite materials of this type consist of textile sheet structures which are impregnated with reactive resins, for example with styrene-containing polyester casting resins or epoxy casting resins, and of a gas- and liquid-impermeable plastics film. The plastics film may be made of polyethylene, PVC or melt-calandered polyurethane and is optionally firmly joined to the textile substrate. The prior art is described in GB-PS Nos. 1,039,836; 1,357,355; 1,423,819 and 1,449,455, and in DE-OS No. 2,362,784 and DE-PS No. 2,240,153. When polyurethanes are used as the plastics film, the film is produced by melt calandering.

The composite material which is processed into a tube, for example sewn and sealed on the seam, is introduced into pipes to repair damaged areas, for example it is "floated in" with water and inflated with compressed air (process according to DE-PS No. 2,240,153) or is preferably "inverted" by pressure while being introduced into damaged pipelines (inversion process according to DE-OS No. 2,362,784).

In this way, the textile layer, impregnated with reactive resin, which is initially on the inside is turned outside to lie against the wall of the pipe. Hot water may be passed into the pipe system to harden the reactive resin.

The prior art composite materials consisting of textile substrates and film layers have a number of disadvantages. Thus, composite materials based on films of PVC or polyethylene are relatively rigid and relatively inelastic, and they may contain plasticizers. These disadvantages complicate the adaptation of the material to, for example, damaged or corroded pipelines. Even the already practiced use of polyurethane films which are produced on a melt roller calander has disadvantages. Thus, the polyurethane films produced thereby are relatively rigid and the composite material is difficult to process by the "inversion process" of DE-PS No. 2,362,784. Moreover, the adhesion between the textile layer and the PU film is often inadequate and requires the application of an adhesifying layer which considerably complicates the technique (brush coating processes and melt calandering processes both have to be applied). In the case of polyethylenes, the adhesion between the web and the film layer is too weak and the seam is difficult to seal. In the case of PVC, the styrene resistance is inadequate.

DETAILED DESCRIPTION OF THE INVENTION

According to the present invention, composite materials, preferably tubular, are provided which have a high stability, plasticity and flexibility, a high extensibility and a high monomer resistance, and are of a simplified processibility when used for lining passages. This is achieved by applying an impermeable polyurethane urea coating comprising at least two layers which are joined together undetachably to the textile in a known direct or, preferably, a transfer coating process in simple coating installations and in simple reactive coating processes, and the side of the coating facing the textile layer comprises a monomer-resistant, cross-linked, filler-containing, non-thermoplastic polyurethane urea coating, and the side remote from the textile layer comprises a substantially linear, thermoplastic, substantially filler-free polyurethane urea layer which may be welded by high frequency, by highly polar solvents or by heat. The at least two, chemically different layers are easy to apply by the high-solid reactive coating process and are joined together in an undetachable manner exhibit the required properties, for example monomer-resistance in the layer adjacent the textile and easy weldability or bondability in the layer remote from the textile, and as composite material, preferably in its tubular form of application, they exhibit an excellent plasticity, flexibility, extensibility and a favorable processibility even in a reactive resin-impregnated condition.

Thus, the present invention provides a composite material laminate, preferably in a tubular form, having high stability, plasticity and flexibility and characterized by its simplified processibility in the lining of passages, comprising (a) a textile layer which may be impregnated with (b) reactive resin, preferably with unsaturated polyester/styrene-reactive resins, and (c) a gas and water-impermeable plastic film, characterized in that a polyurethane urea coating comprising at least two layers which are joined together undetachably is applied as the impermeable layer (c) to the textile layer (a), which coating comprises (d) in its side facing the textile layer (a), of a layer of monomer-resistant, branched, moderately cross-linked, filler-containing, non-thermoplastic polyurethane urea reactive coating, and (e) in its side remote from the textile layer (a), of a layer of a substantially linear, thermoplastic polyurethane urea reactive coating which may be welded by high frequency, by heat or by polar solvents, and optionally (f) has one or more other intermediate layers which constitute a reinforcing woven cloth, a knitted cloth or a strengthened non-woven cloth and/or one or more layers composed differently in the composition of (d) and (e) as intermediate layer, additional adhesive coat or additional cover coat.

The reactive coating layers (d) and (e) are formed by coating on differently composed high-solid systems of blocked NCO prepolymers and aliphatic and/or cycloaliphatic polyamines in the direct coating process and/or (preferably) in the transfer coating process and by a thermal after-treatment. The layers (f) are preferably final coats, based on diol-chain extended polyurethane elastomers.

The invention also provides a process for the production of composite materials of high strength, plasticity and flexibility and of an easy processibility for lining passages, by the production of a bonded laminate of:

(a) a textile layer which may be impregnated with
(b) reactive resins, and
(c) a gas- and water-impermeable layer of plastics films, and optionally by sewing the materials to form a tube and sealing the seam. The process is characterized in that a polyurethane urea coating comprising at least two layers which are joined together undetachably is applied as the impermeable layer (c) to the textile layer (a) by the reactive coating process using high-solid coating compositions of blocked NCO prepolymers and aliphatic and/or cycloaliphatic polyamines and conventional additives in the direct coating process and/or (preferably) in the transfer coating process, and is thermally hardened, and (d) the layer (d) facing the textile layer comprises a high-solid coating composition of blocked NCO prepolymers having a functionality of at least 2.10, preferably from 2.12 to 3.5, and more preferably from 2.20 to 3.0, and from 5 to 40% by weight, preferably from 10 to 35% by weight, and more preferably from 15 to 35% by weight, based on the polyurethane composition, of inorganic fillers, and aliphatic and/or cycloaliphatic polyamines, preferably cycloaliphatic diamines, and more preferably alkyl-substituted diamines of dicyclohexylmethane, with NCO/NH$_2$ ratios of from 1.30:1 to 0.95:1, preferably from 1.25:1 to 0.97:1, and more preferably from 1.10:1 to 0.95:1, and (e) the layer (e) remote from the textile layer comprises a high-solid coating composition of a substantially linear NCO prepolymer, preferably having a functionality of from 1.95 to 2.06, and the diamines mentioned under (d), and optionally (f) a reinforcing woven cloth, a knitted cloth or a non-woven cloth is introduced between the layers (d) and (e) as one or more other intermediate layers, and/or one or more coating applications composed differently in the composition of (d) and (e), preferably based on polyurethanes, is/are applied.

The invention furthermore relates to the use of the preferably tubular composite materials which are composed in this manner, in a form impregnated with reactive resins, for lining passages such as sewers, tunnels, pipelines and water pipes.

The greater plasticity and the flexibility associated with the composite material, which is preferably used in tube form and is produced according to the present process, proves to be a particular advantage when the tube is introduced into the passages or pipes to be repaired. The tubular composite materials are also less susceptible to mechanical damage, because they are hardly swollen at all by monomers such as styrene and the resin-impregnated repair tubes are also stable in storage, because the monomers do not escape. The production of the tubular structure from the web-shaped composite materials is greatly facilitated by the good weldability or bondability and such welded or bonded tube structures are very stable.

The textile layers (a) which optionally may receive the reactive resin are preferably absorbent non-woven cloths or woven cloths or knitted cloths of natural or synthetic fibers, which have a square meter weight of from 100 to about 1000, preferably from 150 to 500, and more preferably from 175 to 400 g/m$^2$. Substantially non-bound or slightly bound, needled and optionally shrunk non-woven cloths based on synthetic fibers, preferably polyester, polyamide or polypropylene fibers or mixtures thereof, or open-worked cloths based on synthetic fibers, in particular polyester fibers, are preferred. Flexible, open-pore foams may also be used according to the present invention on a textile layer or instead of the "textile layer". The non-woven cloths may also be sewn with finer supporting cloths to strengthen the structure. Glass fiber mats are also suitable in this respect.

The reactive resins (b) are known systems based on unsaturated polyesters in monomers (for example styrene) or systems based on epoxides and polyamines. They may be adjusted to be self-hardening at room temperature by suitable catalyst-cocatalyst systems (while observing an adequate pot time of about one or more days). However, it is also possible to use systems which are heat hardenable by hot water or steam.

The gas and water-impermeable film (c) is applied to the textile layer (a) according to the present invention as at least two layers which are joined together and composed differently in the layers (d) and (e). The film (c) is applied to layer (a) by the known high-solid polyurethane reactive process. Apparatus used for this purpose includes conventional coating means with, for example, a doctor application of the coating pastes and with a subsequent drying system, for example drying channels. The coatings may be carried out in the conventional manner in the direct coating process or, more preferably, in the transfer coating process (reversal coating process). The application of each of the layers (d) or (e) and optionally (f) may also be carried out in several coating strokes and it is also possible for the composition of the coats to be varied within the limits of the composition of the individual layers (d) and (e).

The reactive coating generally takes place by the reaction of NCO prepolymers containing blocked NCO groups and slightly volatile aliphatic and/or cycloaliphatic diamines, preferably alkyl-substituted dicyclohexylmethane diamines.

Phenols, malonic esters, acetoacetic esters, caprolactam and similar compounds are suitable as blocking agents for the NCO prepolymers, but alkanone oximes are preferred and butanone oxime is more particularly preferred.

The NCO prepolymers are reaction products of relatively high molecular weight, di- to tetravalent, preferably divalent to trivalent, polyhydroxyl compounds having a molecular weight of from 500 to 10,000, preferably from 1000 to 6000, preferably the starting substances usually known for coating with polyurethane systems, for example di- to tetravalent polyethers, such as polytetramethylene ether, but preferably polyoxypropylene ethers which may also contain polyoxyethylene units in block, or mixed or terminal form in quantities of up to 80% of all the oxyalkylene units, and polyesters which melt below 60° C., and the polythio ethers, polycarbonates, polyacetals, or lactone polyesters which are otherwise usually used, any mixtures thereof or mixed condensation products having ether, ester amide, carbonate or acetal groups.

Compounds which contain high molecular weight polyadducts or polycondensates or vinyl polymers in a finely-dispersed or dissolved form may be used as relatively high molecular weight polyhydroxyl compounds, in particular for layer (d), optionally in admixture with unmodified polyols. These compounds are particularly polyethers, polyesters or polycarbonates containing from about 8 to 40% by weight of polyaddition products of diisocyanates and diamines (including hydrazine or dihydrazide compounds). Polyethers, polyesters or polycarbonates which contain from about 8 to 40% by weight of polymers (for example by the graft polymerization of acrylonitrile and styrene) may also be used. In this case of the polyhydroxyl compounds containing polyadducts, the inorganic filler content may be reduced in layer (d) i.e., may approach the lower limits specified, because the polyadducts also have a certain filler character in that they restrict the swelling due to styrene.

Low molecular weight polyols having a molecular weight of from 62 to about 399 may optionally also be used in the production of the NCO polymers, as they are known per se as chain-lengthening agents. In this respect, butane diol-1,4 or -2,3 or -1,3, diethylene glycol, di-2-hydroxyethyl-sulphide, or trimethylol propane are preferred according to the present invention. Relatively high and low molecular weight polyhydroxyl compounds which are suitable are mentioned in detail in DE-OS No. 2,854,834, pages 11 to 26.

The polyisocyanates mentioned in DE-OS No. 2,854,834, pages 8 to 11, may be used as polyisocyanates, but aromatic polyisocyanates are preferably used. The diphenylmethane diisocyanates in the form of the 4,4'-, 2,2'- and/or 2,2'-isomers or mixtures thereof are preferred according to the present invention, as well as the isomeric toluylene diisocyanates, and in particular, mixtures of these isocyanates.

Suitable starting substances are selected as regards their functionality according to the criteria stated below for the individual layers (d) and (e).

The NCO polymers are produced in a known manner by reacting the polyhydroxyl compounds mentioned with excess diisocyanates, preferably in an NCO/OH ratio of from 1.5:1 to 6.0:1, preferably from 1.7:1 to 2.5:1. The NCO content of the (blocked) NCO prepolymers to be used is from about 1.8 to 8%, preferably from 2.0 to 6%, and more preferably from 2.1 to 5% by weight of NCO.

Blocking takes place by reacting the NCO prepolymer with approximately stoichiometric quantities of the blocking agent, more preferably with butanone oxime, until the NCO group has disappeared.

Certain compositions or functionalities have to be observed for layers (d) and (e), as will be explained in more detail.

The blocked NCO prepolymers may be mixed with up to 50% by weight, preferably up to 15% by weight and more preferably with up to 10% by weight, based on the blocked NCO prepolymer, of organic solvents in order to adjust an optimum processing viscosity of from about 15,000 to 40,000 mPa.s at 20° C. Isopropanol, ethylene glycol monomethylether and their acetic acid esters, methylethylketone, cyclohexanone, butyl acetate and DMF, for example, may be used.

Conventional additives, such as dyes and pigments, thickening agents (for example silicas), flow auxiliaries such as silicones or silicones containing ether groups, or optionally also catalysts may be added to the coating pastes.

Slightly volatile aliphatic and/or cycloaliphatic polyamines and preferably (cyclo) aliphatic diamines which are liquid at room temperature and have a low vapor pressure are used as cross-linking component for the blocked NCO prepolymers. The following are particularly preferred: dicyclohexylmethanediamines, in particular alkyl-substituted diaminodicyclohexylmethanes, for example 4,4'-diamino-3,3'-dimethyl-dicyclohexylmethane, 4,4'-diamino-3,3'-diethyldicyclohexylmethane, 4,4'-diamino-3,3'-diisopropyl-dicyclohexylmethane or asymmetrically alkyl-substituted 4,4'-diaminodi-, -tri- or -tetra-alkylcyclohexylmethanes, for example product mixtures of 3,5-diethyl-3',5'-diisopropyl-dicyclohexylmethane, 3,5,3',5'-tetraethyl-4,4'-diaminodicyclohexylmethane and 3,5,3',5'-tetraisopropyl-4,4'-diaminodicyclohexyl methane (see DE-OS No. 2,920,501) or 3,3'-dimethyl-dodecahydro-diphenyl-4,4'-diamine. Aliphatic diamines or (preferably proportionately in the case of layer (d)) polyamines may also be used, for example 1,12-diaminododecane or 1,5,11-triaminoundecane. 4,4'-Diamino-3,3'-dimethyl-dicyclohexylmethane is particularly preferred. Reactive coating compositions which are particularly preferred are described in U.S. Pat. No. 4,248,756, incorporated herein by reference.

The blocked NCO prepolymers are generally mixed with the polyamine cross-linker approximately in the ratio of the equivalent weights of these components, although a deviation from the stoichiometric ratio is also possible, so that the equivalent ratio of blocked NCO to $NH_2$ according to the present invention is generally from 1.30:1 to 0.95:1, preferably from 1.25:1 to 0.97:1, and more preferably from 1.10:1 to 0.98:1. Thus, NCO excesses may be used, and excess amino groups are only tolerable within relatively narrow limits so that the properties are not impaired.

Based on these reactive coating compositions, the production according to the present invention of the at least two-layered layer (c) consisting of differently composed layers (d) and (e) (and optionally other intermediate layers (f)) will now be described.

The side facing the textile layer is coated with a reactive coating layer (d) of a virtually monomer-resistant, cross-linked, non-thermoplastic polyurethane urea composition. The coating composition used for this purpose must have in its NCO prepolymer component or in the polyamine cross-linking component a functionality of at least 2.10, preferably from 2.12 to 3.5 and more preferably from 2.12 to 2.8. Either relatively high molecular weight polyols having a functionality of more than 2.0, preferably of at least 2.5, for example trifunctional or tetrafunctional polyethers, or polyesters, and/or trifunctional, tetra- or higher functional low molecular weight polyols having a molecular weight of from 62 to 399 are used (proportionately) for this purpose. A suitable functionality may also be obtained by mixing corresponding quantities of relatively high molecular weight di- and/or higher functional and/or low molecular weight di- and/or higher functional polyols. Relatively high molecular weight polyhydroxyl compounds containing polyadducts or vinyl polymers are particularly suitable as relatively high molecular weight polyols.

The suitable functionality of the coating composition within the specified limits may also be adjusted in a particularly simple manner by mixing higher functional NCO prepolymers with bifunctional NCO prepolymers, as described in the Examples. As a result of this, it is possible to adjust a functionality gradient within layer (d) (or (e)) by different mixture ratios for individual, thinner applications even within the functionality limit of layer (d) (or (e)).

A very high degree of cross-linking (for example f'>3.5) indeed also results in a good styrene resistance, but it also provides a poorer flexing behavior of the coating.

Diamines are preferred as polyamines, but they may also contain (preferably minor) quantities of higher functional polyamines.

It has been found that the reactive coating composition (d) must contain fillers in order to achieve as small a monomer swelling as possible (caused, for example by styrene) which is desired according to the present invention. The quantity of fillers amounts to from 5 to 40% by weight, preferably from 10 to 35% by weight and more preferably from 15 to 35% by weight, based on the polyurethane coating layer (d). The fillers are preferably inorganic fillers, such as chalk, talcum, kaolin or similar silicates, silica gel and barite. However, other fillers may also be added, such as glass powder, glass fibers, ground or cut textile fibers (a cut length of preferably from 0.3 to 3 mm), or silicas (for instance, Aerosil).

If relatively high molecular weight polyhydroxyl compounds containing polyadducts or polymers are used for the composition of layer (d), then the (inorganic) filler content may be near the lower limit of the inorganic filler additives with an already high efficiency.

The side remote from the textile layer consists of a substantially linear, thermoplastic polyurethane urea coating layer (e) which may be welded by high frequency, by heat or by highly polar solvents. This layer is also applied for reactive coating processes by using coating compositions based on NCO pre-adducts of an approximately difunctional structure (functionality from about 1.95 to 2.08). These are generally bifunctional, based on linear, relatively high molecular weight polyethers, polyesters and similar compounds, optionally with the addition of low molecular weight diols, and diisocyanates and the already mentioned diamines as the diamine crosslinker. The layer does not usually contain any fillers or only contains relatively small quantities of fillers, because it has been found that too high a content of fillers in this layer (e) has a negative influence on the weldability of the films. However, a content of inorganic fillers of up to about 25% by weight may be introduced which, on the other hand, has proved to be advantageous against styrene swelling on this layer. The layer may also contain conventional additives, for example stabilizers or coloring pigments.

A two-layered structure of layer (c) is preferred with components (d) and (e). The individual layers (d) and (e) may each be applied in an individual coating stroke or in several thinner coating strokes in order to ensure a complete drying or reaction of the layers which is as pore-free as possible. If several coating strokes are applied for one layer, then a certain variation in composition, say for layer (d), a variation in functionality or in the quantity of filler may also be carried out within the composition claimed.

For some purposes, one or more intermediate textile layers (f) may also be provided between layers (d) and (e) and they are also included in the multi-layer coating layer (c). Thus, a reinforcing woven cloth, knitted cloth or possibly a strengthened non-woven cloth may be used as the intermediate layer (f), for example a thin (preferably less than 100 g/m$^2$) polyester, polyamide or polypropylene woven cloth or knitted cloth which is optionally adjusted to be elastic, for example elastic knitted cloths based on spandex filaments and polyester or polyamide filaments.

However, the intermediate layer (f) may also be any polyurethane layer, for example one or two-component PU coating compositions or polyurethane or polyurethane urea reactive coating compositions with a different composition from (d) and (e), preferably diol-extended polyurethanes.

The polyurethane urea coatings (layer (c)) are generally applied in a total layer of from 150 to 1000 g/m$^2$, preferably from 200 to 600 g/m$^2$, the side facing the textile (also termed "adhesive coat") making up from about 1/6 to 5/6 of the total application. A layer thickness of from 100 to 500 g/m$^2$ is preferred, preferably from 100 to 400 g/m$^2$, for the adhesive layer facing the textile and a layer thickness of from about 100 to 500 g/m$^2$, preferably from 100 to 300 g/m$^2$ is preferred for the so-called "cover coat" layer (e) remote from the textile.

The polyurethane urea layer (c) comprising at least two layers (d+e+possibly f) which is applied according to the present invention is practically monomer-tight and practically resistant to swelling by monomers of the reactive resin filling of layer (a) and may also be welded to the outside of the composite material. This is an extremely important property combination for the use according to the present invention. Moreover, the transfer and direct coating process using high-solid polyurethane systems may be carried out in a simple form on coating machines which are distributed universally. Complex machine combinations of extruders and melt roller calanders and possibly even additional coating installations are unnecessary.

In the preferred embodiment, the composite material which is produced in web shape is used in a tubular form for lining passages. The composite material web is formed into a tube by sewing, an overlap of the seams preferably being avoided. The seams have to be covered in order to achieve the necessary imperviousness, for example with sealing strips. These strips are selected from such materials which are joined undetachably to layer (e) by high frequency welding, thermal welding, welding by initially dissolving both layers using (highly) polar solvents, for example dimethylformamide, dimethylacetamide, dimethyl sulphoxide and others, or by bonding agents (for example adhesives based on polyisocyanates) and which have a sufficient extensibility and resistance. The sealing strips are preferably made of coating compositions of layer (e) or other substantially linear polyurethane elastomers, preferably diol-extended polyurethanes.

Tubular composite materials sewn in this manner so as not to overlap and bonded using sealing strips of PU coating compositions (e) by polar solvents are particularly suitable due to their properties of plasticity and flexibility and resistance after filling with reactive resin (b) for use as repair tubes for lining passages.

The reactive resins (b) are generally introduced into the tubular structure before the structures are introduced into the pipes or lines. The resin may be pumped into the tube through bores or injected through long pipes or drawn in by vacuum. The layer (a) which is thus impregnated with reactive resin may be homogenized by guiding the repair tube through press rollers (see, for example, DE-PS No. 2,240,153, column 4/5).

The invention is further illustrated, but is not intended to be limited by the following examples in which all parts and percentages are by weight unless otherwise specified.

EXAMPLES

Preliminary note: the functionality of the compounds which are used is calculated using the following formulae:

$$\frac{f \times 56 \times 1000}{OH \text{ number}} = \text{molecular weight} \quad (I)$$

(for example for converting OH number molecular weight with the known functionality f of, for example, polyhydroxyl compounds)

$$f' = \frac{\Sigma \text{val } A - \Sigma \text{val } B}{\Sigma \text{mol } (A + B) - \Sigma \text{val } b}, \text{ wherein} \quad (II)$$

wherein

A represents the excess component (for example the polyols during the production of hydroxy polyesters or the polyisocyanates during the production of NCO prepolymers);

$f'$ is the self-adjusting functionality of optionally differently functional starting substances which react together in the product (for example in the NCO prepolymer); and val are equivalents ($f'$ val terminal groups are contained in one mol of a polyfunctional compound).

When calculating the functionality of NCO prepolymers in the following Examples the blocking agents (for example butanone oxime) are not considered.

EXAMPLE 1

1.1 Cover coat for the production of the layer remote from the textile substrate (layer (e)):

A butanone oxime-blocked, difunctional ($f'=2$) NCO prepolymer having a (masked) NCO content of 5.0% is produced from 690 parts of a linear polyoxypropylene glycol of OH number 95 (molecular weight 1179; 0.5824 mols), 204 parts of toluylene diisocyanate-2,4/2,6 (80/20 isomer mixture) (1.3793 mols; NCO/OH ratio 2.37:1) and 106 parts of butanone oxime. 1000 g of this difunctional NCO prepolymer, 7.5 g of highly disperse silica (Aerosil®380, Degussa), 15 g of ethylene glycol monoethylether acetate, 10 g of polyether-polydimethyl siloxane block polymer (Baysilon OS 50; Bayer AG-D 5090 Leverkusen) and 130 g of 3,3'-dimethyl-4,4'-diamino-dicyclohexylmethane (stereoisomer mixture) are mixed with stirring to form the cover coat paste (e) (NCO/NH$_2$ ratio 1.035:1).

1.2 Adhesive coat for the production of the layer facing the textile substrate (layer (d)):

1.2.1 Branched NCO prepolymer d/1

380 parts of a trifunctional polyoxypropylene polyether of OH number 30 (molecular weight 5600; 0.0679 mols), 23.5 parts of a difunctional, propoxylated 4,4'-dihydroxy-diphenyl-dimethyl-methane of OH number 200 (molecular weight 560; 0.0420 mols), 35.5 parts of 4,4'-diphenylmethane-diisocyanate (0.142 mols), 124.5 parts of toluylene diisocyanate (80/20 2,4-/2,6-isomer mixture) (0.1408 mols) and 26.5 parts of butanone oxime are reacted to produce a blocked NCO prepolymer and diluted with 10 parts of ethylene glycol monoethylether to produce a coatable NCO prepolymer (having about 2.4% by weight of blocked NCO groups). (Solids content 98% by weight; functionality of branched NCO prepolymer: $f'=2.64$).

1.2.2 Adhesive coat paste d/2 (mixture of d/1 and cover coat paste (e) (1:1)):

500 g (0.1080 mols) of the branched ($f'=2.64$) prepolymer paste and 500 g (0.2979 mols) of the difunctional ($f'=2.0$) NCO prepolymer described in Example 1 for the production of the cover coat (e), 7.5 g of highly disperse silica (Aerosil®380 produced by Degussa), 15 g of ethylene glycol monomethylether acetate, and 10 g of polyether silicon (Baysilon OS 50, Bayer AG) are mixed together. The total functionality of the mixture of NCO prepolymers is 2.135. This mixture is mixed with stirring with 99 g of 3,3'-dimethyl-4,4'-diamino-dicyclohexylmethane (NCO/NH$_2$ ratio o=1.01:1).

1.3 Bonding between the textile sheet structure and the gas- and liquid-impermeable, two-layer polyurethane layer (transfer process):

A layer (e) which has completely reacted to form a thermoplastic polyurethane film weighing about 150 g/m$^2$ after a channel passage at 140/160/160° C. is applied to a smooth-mat separating paper from the above-mentioned cover coat paste (e) with a doctor gap of 0.27 mm. The adhesive paste mixture d/2 (250 g/m$^2$), is then applied thereon by a doctor with a doctor gap of 0.35 mm on the second coating apparatus of a tandem coating installation, and covered with an unbound, shrunk polyester needled web (a) weighing about 250 g/m$^2$. The adhesive coat (d) is freed from the small quantities of solvent in a second channel at 135/150/160° C. and is reacted, with the release of the blocking agent. The running speed of the coating installation is 10 m/min.

After the separating paper has been removed, the resulting bonding between the textile sheet structure and the two-layered polyurethane layer (consisting of the two layers d+e which are firmly joined together) may be impregnated with reactive resins (b) in a known manner on the textile side.

According to the present invention, the surface of the polyurethane urea film, on the side remote from the textile substrate, may be welded by heat and high frequency and/or may be bonded under pressure after initially dissolving with dimethylformamide or dimethylacetamide. The two-layered polyurethane urea layer is impermeable to gas and liquid, and the side of the layer facing the textile, the adhesive coat side, is practically swelling-stable with respect to a number of organic compounds, in particular to monomers such as styrene which act on the polyurethane urea layer through the textile from the reactive resin.

The composite material, which is obtained and is sewn up in a non-overlapping manner to form a tube is sealed on the seam by welding with a film corresponding to the thermoplastic cover coat (e) and is impregnated with reactive resin (b), is very soft and flexible and this is very easily inserted into the pipe to be repaired.

1.4 Varied Process

When a paste which also contains 8% by weight of chalk as filler is used as the cover coat (e), and the process is carried out as described above, then a composite material is obtained which is more stable to swelling caused by monomers in the cover layer (e) as well, but which may also still be effectively welded and processed into a tube which is very resistant in a form filled with reactive resin and may be processed in a reliable manner.

EXAMPLE 2

2.1 Cover coat (e):
Composition as described in Example 1.

2.2 Adhesive coat (d):
500 g (0.108 mols) of the adhesive coat paste described in Example 1 (f'=2.643), but using 10 parts of ethylene glycol with monomethylether acetate and 500 parts (0.2979 mols) of the difunctional cover coat paste (e) as described in Example 1, are mixed together with 150 parts of talcum powder (total functionality of NCO prepolymer about 2.14). 96 parts of 3,3'-dimethyl-4,4'-diamino-dicyclohexylmethane (NCO/NH$_2$ ratio of about 1.04:1) are mixed with the NCO prepolymer mixture.

2.3 Bonding between the textile sheet structure and the two-layered reactive coating (reversal process):
A cover coat of 200 g/m$^2$ is produced on a smooth-mat separating paper, as in Example 1. The adhesive coat paste (300 g/m$^2$) is applied thereon using a doctor with a gap of 0.45 mm on a second coating apparatus of a three stroke coating installation and is left to pre-react at 135° C. in the second channel, and the textile substrate, a needled web according to Example 1, is covered before the third channel in a so-called dry covering process. The adhesive coat finally completely reacts to produce the polyurethane urea in the third channel at 160° C. The bonding between the textile and the two-layered film which is produced by the dry covering process has properties which are comparable with the composite material produced in Example 1 by the wet covering process, but it is slightly softer and more flexible.

2.4 Varied process:
If the 96 g of 3,3'-dimethyl-4,4'-diamino-dicyclohexyl methane compound in the adhesive coat (d) are replaced by an equivalent quantity of 4,4'-dicyclohexylmethane-diamine (liquid isomer mixture), or by 3,3',5,5'-tetraethyl-dicyclohexylmethane-4,4'-diamine, then almost identically useable composite materials are obtained.

EXAMPLE 3

3.1 Cover coat (e):
A blocked, difunctional NCO prepolymer is produced in conventional manner from 650 parts of an ethylene glycol/butanediol-1,4-adipate (OH number 56), 19 parts of hexanediol-1,6, 158 parts of toluylene diisocyanate (80/20 isomer mixture of 2,4- and 2,6-isomers) and 73 parts of butanone oxime, and is diluted with 100 parts of ethylene glycol monomethylether acetate. The (blocked) NCO content is 3.6%. 1000 g of this blocked NCO prepolymer, 7.5 g of highly disperse silica (Aerosil ® produced by Degussa), 15 g of ethylene glycol monomethylether acetate, 10 g of polydimethyl siloxane containing polyether groups (OS 50; Bayer AG) and 97.8 g of 3,3'-dimethyl-4,4'-diaminodicyclohexylmethane (NCO/NH$_2$ ratio 0.99:1) are mixed with stirring.

3.2 Adhesive coat (d):
An NCO prepolymer is produced from 325 parts of a trifunctional polyoxypropylene ether of OH number 30, (molecular weight 5600; 0.0584 mols), 162 parts of a linear polyoxypropylene ether glycol (OH number 112, molecular weight 1000; 0.1620 mols), 235 parts of a difunctional hexanediol-1,6/2,2-dimethylpropanediol-1,3 (65/35)-adipic acid polyester of OH number 65 (molecular weight 1723; 0.2100 mols), 66 parts of toluylene diisocyanate (80/20 isomer mixture; 0.3793 mols), 96 parts of 4,4'-diisocyanatodiphenylmethane (0.3840 mols) and 66 parts of butanone oxime, and diluted with 50 parts of isopropanol. The NCO content is 3.2%. 1000 g of this butanone oxime-blocked NCO prepolymer are mixed with 255 g of kaolin and 81 g of 3,3'-dimethyl-4,4'-diamino-dicyclohexylmethane, with stirring. The functionality, f', of this adhesive coat (see formula II)) is 2.23.

3.3 Bonding between the textile sheet structure and the two-layered polyurethane (reversal process/dry covering process):
A thermoplastic cover coat of 120 g/m$^2$ is produced on a smooth-mat separating paper, as in Example 1, from the cover coat paste (e) described under Example 3.1. The adhesive coat paste, 280 g/m$^2$, is applied thereon by a doctor with a gap of 0.40 mm on the second coating apparatus of a three stroke coating installation and is allowed to pre-react at 135° C. in the second channel, and the textile substrate, a polyester woven cloth of 200 g/m$^2$, is covered before the third channel in a so-called dry covering process. The cross-linking reaction is completed at 160° C. in a third heating channel.

The surface of the polyurethane urea layer (c) consisting of two layers (d+e) which is firmly joined to the textile substrate (a) may be thermally welded under high frequency with itself or with an applied thermoplastic film of cover coat type (e). The complete two-layered film is impermeable to gas and liquid, and the side of the film facing the textile, the adhesive coat side, is practically resistant to swelling caused by styrene.

EXAMPLE 4

4.1 Adhesive coat (d):
The coating paste described in Example 3.2 as adhesive coat (d) is applied by a doctor on a polyester fiber web which weighs about 250 g in the direct coating process (application 100 g/m$^2$ dry weight). Cross-linking takes place at 135/150/160° C., residence time in the channel 1.5 minutes.

4.2 Cover coat (final coat) (e):
1000 g of the cover coat paste (e) from Example 3.1 and 50 g of a 50% solution of a polyacrylate in ethyl acetate, 5 g of polydimethyl polysiloxane containing ether groups (Baysilon OS 50; Bayer AG) and 95 g of 3,3'-dimethyl-4,4'-diamino-dicyclohexylmethane (NCO/OH=1.02:1) are mixed with stirring.

This paste is applied using a doctor as the final coat (cover coat) on the primed polyester web in the direct coating process. Application about 120 g/m$^2$. Reaction temperature 140/160/160° C., residence time about 1.5 minutes.

The final thermoplastic coat may be welded by heat and by high frequency. The cross-linked and filled first coat is swelling-resistant to styrene.

COMPARATIVE EXAMPLE (V-1)

V-1.1 Cover coat (e) (but not thermoplastic)

An NCO prepolymer is produced from 553 parts of a trifunctional polyoxypropylene ether triol of OH number 30, 134 parts of a hexanediol-1,6/2,2-dimethyl-propanoldiol-1,3 (65/35) adipate (OH number 65), 2 parts of butanediol-1,4, 38 parts of toluylene diisocyanate (80/20 isomer mixture), 104 parts of 4,4'-diisocyanato-diphenyl methane and 69 parts of butanone oxime, and is diluted with 100 parts of ethylene glycol monomethylether acetate. 1000 parts of the blocked NCO prepolymer thus produced (3.3% NCO), 7.5 g of highly disperse silica (Aerosil 380 produced by Degussa), 15 g of ethylene glycol monomethylether acetate, 10 g of polydimethylsiloxane containing ether groups (Baysilon OS 50; Bayer AG) and 98 g of 3,3'-dimethyl-4,4'-diamino-dicyclohexylmethane are mixed with stirring.

V-2 Adhesive coat (d) (thermoplastic, without inorganic fillers):

An NCO prepolymer containing 2.4% of NCO is produced from 828 parts of a linear oxypropylene-ether diol of OH number 56, 122 parts of toluylene diisocyanate (80/20 isomer mixture) and 50 parts of butanone oxime. 1000 g of this prepolymer, 15 g of ethylene glycol monomethylether acetate, 10 g of polydimethylsiloxane containing ethyl groups (Baysilon OS 50; Bayer AG) and 68 g of 3,3'-dimethyl-4,4'-diamino-dicyclohexylmethane are mixed with stirring.

V-3 Bonding between the textile sheet structure and the two-layered polyurethane:

A layer which has completely reacted to form a non-thermoplastic polyurethane film of about 150 g/m$^2$ after passing through the channel at 140/160/160° C. is applied to a smooth-mat separating paper using the comparative cover coat paste with a doctor gap of 0.30 mm. The unfilled comparative adhesive coat paste, application 250 g/m$^2$, is applied thereon using a doctor with a gap of 0.35 mm on the second coating apparatus of a tandem coating installation, and is covered with an unbound, shrunk polyester needled web weighing about 250 g/m$^2$. The adhesive coat is freed from the small quantities of solvent in the second channel at 140/150/160° C. and is reacted.

The bonding between the textile and the two-layered polyurethane reactive layer which is obtained after removing the separating paper is not thermoplastic on the side remote from the textile, i.e. it cannot be welded thermally or in practice by high frequency and may only be bonded in an unsatisfactory manner. The adhesive coat side facing the textile which is thermoplastic but not filled swells most considerably under the influence of styrene and results in a wrinkled surface of the tube, with the different layers starting to become detached.

EXAMPLE 5

5.1.1 Cover coat layers (e)

The cover coat paste (e) according to Example 1.1 is applied to a smooth mat separating paper using a doctor in a layer thickness of 60 g/m$^2$ (dry film) and is dried and completely reacted after a channel passage at 140/160/160° C.

5.1.2 2. Coat of the cover coat layer (e)

A second coat is applied in a thickness of 65 g/m$^2$ on this first cover coat using the above-mentioned cover coat paste which, however, also contains 10% by weight of chalk as filler, and is completely reacted in the channel as described above.

5.2.1 Adhesive coat layers (d)

The adhesive coat paste mixture d/2 (according to Example 1.2.2) is applied in a thickness of 60 g/m$^2$ (dry weight) on the cover coat layer (e) which is applied in two coats, in an overall thickness of 125 g/m$^2$, and is completely reacted by passing through the channels as described above.

5.2.2 2. Adhesive coat of a varied composition

A more strongly cross-linking adhesive coat paste is dried in a layer thickness of about 90 g/m$^2$ on the previous coats in another passage, and is completely reacted as usual in the drying channel. The more strongly cross-linking adhesive coat paste was produced from 700 g of the branched adhesive coat NCO prepolymer d/1 (according to Example 1.2.1), 300 g of the linear cover coat NCO prepolymer (according to Example 1.1), 7.5 g of a highly disperse silica (Aerosil®380 produced by Degussa), 20 g of ethylene glycol monomethylether acetate and 12 g of polyether polydimethylsiloxane (Baysilon OS 50; Bayer AG), 200 g of chalk and 82.13 g of 3,3'-dimethyl-4,4'-dicyclohexylmethane.

5.2.3 3. Adhesive coat

The adhesive paste mixture d/2 (Example 1.2.2) is applied in a thickness of about 200 g/m$^2$ on the two-layered coating which already contains 4 coats, with a doctor gap of about 0.35 mm, and is covered together with an unbound, shrunk polyester needled web weighing about 270 g/m$^2$, and is freed from the small quantities of solvent in a drying channel at 135/155/165° C. (10 m/min belt speed) and is reacted, with the release of the blocking agent. A completely homogeneous, pore-free, two-layered coating is produced which is firmly combined with the web, although it is a soft and flexible composite material. The composite material exhibits an outstanding resistance to the styrene of the reactive resin (after the separating paper has been removed), even after having been stored for one week at 40° C.

EXAMPLE 6

Swelling tests in liquid styrene depending on fillers and on the quantity thereof Composite materials are produced as in Example 1 from a cover coat 1.1 and an adhesive coat mixture 1.2.2 and a textile bonding according to 1.3, but, instead of the quantity of chalk specified in the adhesive coat paste, the quantity of inorganic fillers specified in the Table (in % by weight, based on reacted polyurethane urea coating including filler) is used.

The composite materials are introduced into styrene in strips of 5×12 cm at from 20° to 22° C. (room temperature) and their behavior is tested after different periods of time.

EXAMPLE 7

Reversal coating process on a separating paper, applying a polyester needled web into the wet adhesive coat layer.

7.1 Additional cover coat layers (f) on polyurethane basis.

7.1.1.:

A 25% solution of a diol-chain extended polyurethane (on the basis of an adipic acid-butane-1,4-diol-polyester (molecular weight 2250), diphenylmethane-4,4'-diisocyanate and butanediol-1,4 in a molar ratio of 1:5:5) in a dimethylformamide/toluene (1:1) solvent mixture is applied on a smooth-mat separating paper (160 g/m²) and is dried in a heating channel at 80/90/110° C. (40 g/m² polyurethane dry weight).

7.1.2.:

A 25% solution of a polyurethane according 7.1.1 is mixed with 6% per weight (per solid polyurethane) of a triisocyanate (reaction product of an aliphatic triol with excess toluylene-2,4-diisocyanate). The solution is applied on the 7.1.1.-coating in same thickness and under conditions as described in 7.1.1.

7.2. Cover coat (e) on the basis of a high solid-reactive composition

The cover coat paste (e) according to example 1.1 is applied onto the layers 7.1.1 and 7.1.2. The layer 7.2 is dried and reacted in usual manner in a heating channel at 130/150/170° C. (application 100 g/m² dry weight).

7.3 Adhesive coats (d)

7.3.1 Adhesive coat d/1

50 parts of the branched high solid-NCO-prepolymer d/1 according example 1.2.2 and 50 parts of the linear high solid NCO-prepolymer of the cover coat paste (e) according example 1.1 are mixed with 10 parts of Omya-chalk BSH, one part of the polyether silicone according example 1 and 9.6 parts of 3,3'-dimethyl-4,4'-diamino-dicyclo hexyl methane to form the adhesive coat d/1. It is applied on the cover coat layers 7.1 and 7.2 and dried in a channel at 130/145/160° C. (application 100 g/m² dry weight).

7.3.2 Adhesive coat d/2

100 parts of the branched high solid NCO-prepolymer d/1 (see example 1.2.1) and 3 parts of highly disperse silica (Aerosil ®), 1 part of the polyether silicone (see example 1) and 6.2 parts of the fluid stereo isomer mixture of 3,3'-dimethyl-4,4'-diamino-dicyclohexyl-methane are mixed and applied onto the layers 7.1, 7.2 and 7.3.1.

Into the still wet adhesive coat 7.3.2 the polyester web (according example 1) is applied, softly pressed and dried and reacted in a heating channel at 140/160/160° C. (application 170 g/m² dry weight).

The resulting combined, highly flexible coating (application 450 g/m²) is free of voids, holds tight against the reactive solvent styrene of the reactive resin (b) and is sufficiently stable against swelling. After releasing the antiadhesive paper, the coating can be undetachably adhired between its layer (f) and foils based on diol-chain extended, thermoplastic polyurethane elastomers when sealing the coating to form the tubes.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composite material laminate comprising:
   (i) a textile layer
   (ii) a gas and water-impermeable-plastic film comprising
      (ii-a) a layer of filler-containing polyurethane-urea coating composition derived from blocked NCO prepolymers having a functionality of at least 2.10 and aliphatic and/or cycloaliphatic polyamines having an NCO/NH$_2$ ratio of from 1.3:1 to 0.95:1 and containing about 5 to about 40% relative to the weight of the composition of inorganic fillers and
      (ii-b) a layer of a substantially linear, thermoplastic polyurethane-urea coating derived from a linear NCO-prepolymer having a functionality of from 1.95 to 2.06 and aliphatic and/or cycloaliphatic polyamines having an NCO/NH$_2$ ratio of from 1.30:1 to 0.95:1 said (ii-a) and said (ii-b) being joined together undetachably, said (ii-a) facing said (i) and said (ii-b) being remote from said (i), said (ii-a) and said (ii-b) being further characterized in that they are formed by coating the corresponding high solid systems comprising blocked NCO-prepolymers and aliphatic or cycloaliphatic polyamines, in the direct or transfer coating process.

2. The composite material of claim 1 wherein said (ii-a) is produced from at least one 2.10 to 3.5-functional NCO-prepolymer or polyamine reactive component.

3. The composite material of claim 1 wherein said (ii-a) contains about 8 to about 25% by weight of a member selected from the group consisting of chalk, talcum and kaolin.

4. The composite material of claim 1 wherein said (ii-e) is produced from substantially linear reaction components.

5. The composite material of claim 1 wherein said (ii) measures about 200 to about 600 g/m².

6. The composite material of claim 1 wherein said (ii-a) measures about 100 to about 500 g/m² and said (ii-b) measures about 100 to about 200 g/m².

7. The composite material of claim 1 wherein said reactive coating is the product of a reaction of butanone oxime-blocked NCO-prepolymers of relatively high molecular weight polyethers and/or polyesters and optionally low molecular weight diols and diphenylmethane-4,4'-diisocyanate and/or toluylene diisocyanates

| | Quantity of filler[1] (% by weight) (in the "adhesive layer" d) | | | | | |
|---|---|---|---|---|---|---|
| Time | 0 | 5 | 10 | 15 | 20 | 30 | 40 |
| 1h | considerable swelling with detachment from the web | considerable swelling | moderate swelling | still moderately slight swelling | slight swelling | | very slight swelling |
| 3h | | coating "wrinkled" | coating slightly "wrinkled" | slightly "wrinkled" surface | surface of coating slightly changed | | surface of coating virtually unchanged smooth |

[1]Chalk (Mistron-OMYA-BSH; OMYA-Belgium)
When the experiment is repeated with 10% by weight of chalk in the adhesive layer and in the cover layer(e), a discernible swelling is observed after one hour, and only a very slightly wrinkled surface is observed after three hours.
Additions of fillers, for example talcum or kaolin, in the quantities specified have practically the same effect.

and dicyclohexyl methane diamines which are optionally alkyl substituted.

8. The composite material of claim 1 in tubular form.

9. The composite material laminate of claim 1 wherein said textile layer is impregnated with a reactive resin system based on unsaturated polyesters in monomers or on epoxides and polyamines.

10. The composite material laminate of claim 1 wherein said (ii) further comprises at least one intermediate layer, selected from the group consisting of a reinforcing woven cloth, a knitted cloth and a strengthened non-woven cloth.

11. The composite material laminate of claim 1 wherein said (ii) further comprises an adhesive coat or a cover coat facing said (ii-b) and comprising a diol-extended polyurethane.

12. The composite material laminate of claim 1 wherein said high solid systems comprise aliphatic and cycloaliphatic polyamines.

13. The composite material laminate of claim 1 wherein said (ii-a) and said (ii-b) are formed by a combination of the direct coating process and the transfer coating process.

14. The composite material laminate of claim 1 wherein said (ii-b) is further characterized in that it is weldable by any of high frequency, heat or highly polar solvents.

15. A process for the production of a composite material bonded laminate comprising
(i) applying to a textile layer a gas-and-water-impermeable layer system comprising a polyurethane-urea reactive coating comprising (ii-a) a layer comprising a high solid coating composition of blocked NCO-prepolymers having a functionality of at least 2.10 and containing about 5 to 40% by weight based on the polyurethane composition of inorganic fillers and aliphatic and/or cycloaliphatic polyamines having an $NCO/NH_2$ ratio of from 1.3:1 to 0.95:1 which layer faces said textile layer and (ii-b) a layer comprising a high solid coating composition of a substantially linear NCO-prepolymer having a functionality of from 1.95 to 2.06 and aliphatic and/or cycloaliphatic polyamines having an $NCO/NH_2$ ratio of from 1.30:1 to 0.95:1 which layer is remote from said textile layer, said (ii-a) and said (ii-b) being joined together undetachably, and
(ii) thermal hardening of said gas-and-water-impermeable layer.

16. The process of claim 15 wherein said application is carried out by a direct coating process or by a transfer coating process or by a combination of both.

17. The process of claim 16 further comprising impregnating said textile layer with a reaction resin system based on unsaturated polyesters in monomers or on epoxides and polyamines subsequent to said thermal hardening.

18. The process of claim 15 wherein said production further comprises the application of a top coat consisting of a diol extended polyurethane, said top coat facing said (ii-b) said application of said top coat being before said thermal hardening.

* * * * *